Oct. 29, 1940.  J. H. SCHURCH  2,219,702
INDUCTION MOTOR
Filed Aug. 7, 1937      5 Sheets-Sheet 1

INVENTOR.
JACOB H. SCHURCH,
BY Arthur P. Knight and
Alfred W. Knight
ATTORNEYS.

Oct. 29, 1940.   J. H. SCHURCH   2,219,702
INDUCTION MOTOR
Filed Aug. 7, 1937   5 Sheets-Sheet 2

INVENTOR.
JACOB H. SCHURCH,
BY Arthur P. Knight and
Alfred W. Knight
ATTORNEYS.

Oct. 29, 1940.   J. H. SCHURCH   2,219,702
INDUCTION MOTOR
Filed Aug. 7, 1937   5 Sheets-Sheet 3
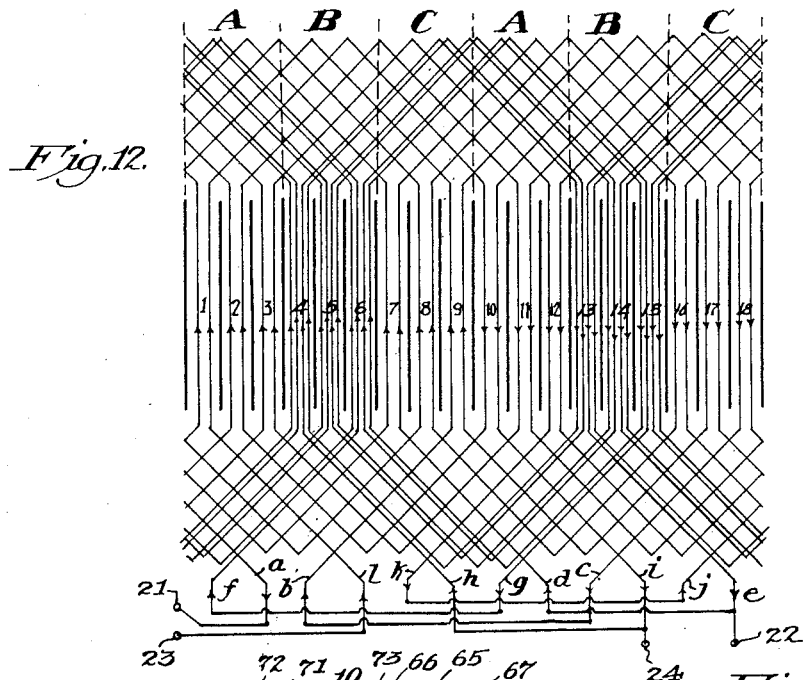
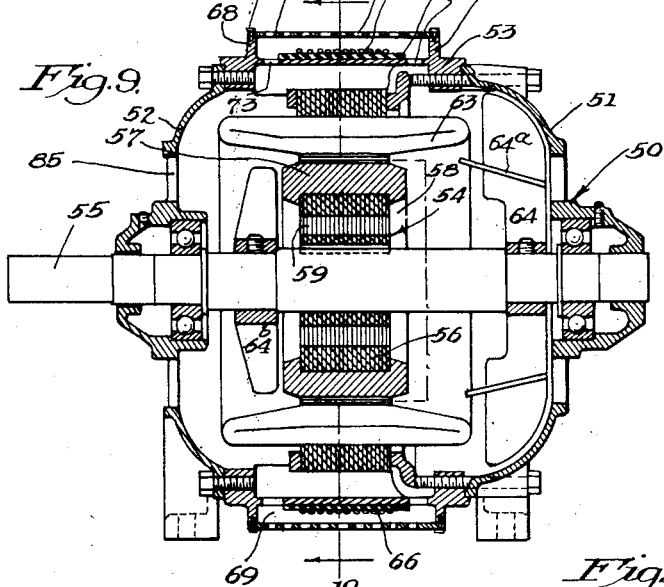
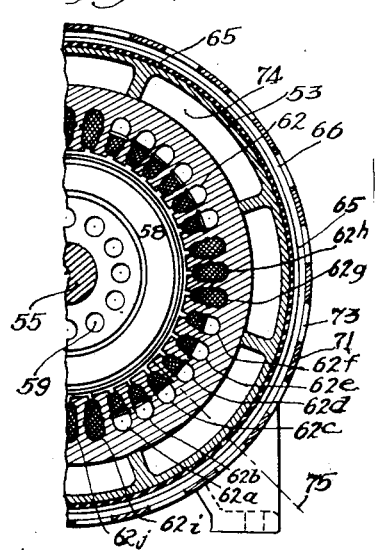
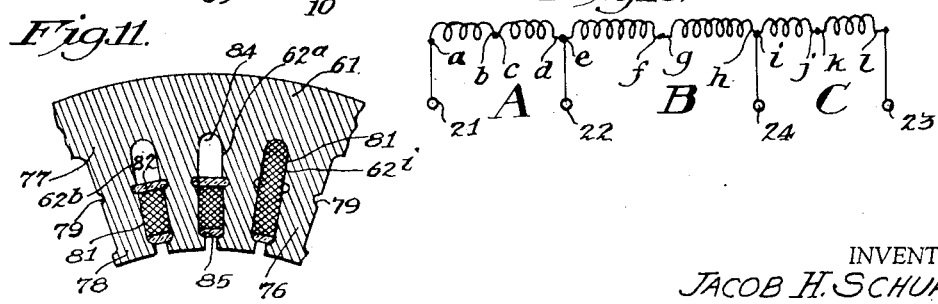
INVENTOR.
JACOB H. SCHURCH,
BY
ATTORNEYS.

Oct. 29, 1940.                J. H. SCHURCH                2,219,702
                              INDUCTION MOTOR
                           Filed Aug. 7, 1937              5 Sheets-Sheet 4

INVENTOR.
JACOB H. SCHURCH,
BY
                    ATTORNEYS.

INVENTOR.
JACOB H. SCHURCH,

Patented Oct. 29, 1940

2,219,702

UNITED STATES PATENT OFFICE 2,219,702

INDUCTION MOTOR

Jacob H. Schurch, Los Angeles, Calif., assignor of one-half to William H. Heise, Los Angeles, Calif.

Application August 7, 1937, Serial No. 157,919

12 Claims. (Cl. 172—275)

This invention relates to induction motors and pertains more particularly to single phase induction motors.

A particular object of the invention is to provide a single phase induction motor in which the main single phase winding is utilized both for the starting and the running winding.

Another object of the invention is to provide a single phase induction motor which may be started or reversed without interrupting the continuity of any of the windings.

A further object of the invention is to provide such a motor, in which all of the slots are employed, with windings which are of lower resistance than those ordinarily employed.

A further object of the invention is to utilize the space ordinarily used for the starting winding in such an induction motor for part of the main winding.

Another object of the invention is to provide an induction motor winding having part of the groups of conductors in parallel and part in series, in which all the coils may have the same number of turns and each slot may contain the same number of conductors.

Another object of the invention is to better the power factor and starting torque of such a single phase motor by distributing the main winding in a larger number of slots to decrease the leakage flux.

A further object is to increase the efficiency and maximum power output for a given size single phase motor frame by increasing the wire size and consequently decreasing the resistance of the winding.

Another important object of the invention is to provide a flux distribution in the pole faces of such a single phase motor, which approaches sinusoidal.

A further object is to increase the maximum flux in a single phase induction motor without increasing the iron losses, while decreasing the copper losses and obtaining improved motor performance.

Another object of the invention is to provide a single phase induction motor winding in which part of the winding groups are in parallel and part are in series.

A further important object of the invention is to provide an induction motor winding having part of the groups of conductors in parallel and part in series, in which a parallel group carries the heaviest current during the starting.

Another object of the invention is to provide a single phase induction motor with a greater total flux per pole for a given maximum flux density, which as a consequence results in a greater power output for a given maximum flux density and iron loss.

Another object of the invention is to provide a starting resistor which is wound around the motor frame.

It is well known that a single-phase induction motor presents a number of distinct advantages, especially when used with a squirrel cage rotor, whereby collector rings and brushes may be eliminated. Such motors may be advantageously employed in rooms in the presence of explosive gases or inflammable materials without danger of explosion or fire. However, existing single-phase squirrel cage motors do not have the maximum load capacity and the maximum torque that a multi-phase induction motor of the same frame size would have. These properties of the single-phase induction motor have been improved by using a high resistance rotor and some means to produce a two-phase field for starting such as combinations of capacity and inductive reactance. Increasing the rotor resistance has the disadvantage of decreasing the efficiency and the use of capacity reactance starting necessitates the waste of considerable space for the capacitor unit. The majority of single-phase motors are not wound with a fully distributed winding but have the winding concentrated at the poles and use, for example, a concentric winding. A high inductance starting winding is then usually wound in the unused slots and is connected through a centrifugal contactor to the line. This starting winding is utilized only during starting and is disconnected from the line after the motor comes up to speed.

I have found that the slot space utilized by this starting winding may be advantageously employed in the main single-phase winding so that the wire size of the main single-phase winding may be increased to produce a corresponding increase in the efficiency and maximum output of the motor. This distribution of the main single-phase winding in a larger number of slots also tends to decrease the leakage flux and increase the power factor and the starting torque.

The maximum flux, $\phi_{max} = A_p \times B_{av}$; where $A_p$ = Area of pole face and $B_{av}$ = average induction. For a triangular flux distribution, which approximates the condition usually found in single-phase induction motors, $$B_{av} = \frac{B_{max}}{2}$$

For a sinusoidal flux distribution $$B_{av} = \frac{B_{max}}{1.57}$$

As in a transformer the terminal

E. M. F. $= 4.44 T \times A_p \times B_{av} \times f \times 10^{-8}$ volts;

where T = turns, and $f$ = frequency in cycles/sec. Thus $$T = \frac{E.\ M.\ F. \times 10^8}{4.44 \times A_p \times B_{av} \times f} = \frac{K}{B_{av}}$$

where K = a constant

Hence for a given $B_{max}$, on which the iron losses in the machine depend, $$T_1 = \frac{K}{B_{av}} = \frac{K}{\frac{B_{max}}{2}} = \frac{2K}{B_{max}}$$

for triangular field, $$T_2 = \frac{K}{B_{av}} = \frac{K}{\frac{B_{max}}{1.57}} = \frac{1.57 K}{B_{max}}$$

for sinusoidal field, so $$\frac{T_2}{T_1} = \frac{1.57 K}{\frac{B_{max}}{\frac{2K}{B_{max}}}} = \frac{1.57}{2} = .785$$

or with a fully distributed winding proportioned to give a sinusoidal flux distribution only 78.5% of the turns are required to give the same maximum flux density ($B_{max}$) had with a triangular distribution.

In consequence, for a sinusoidal flux distribution the number of turns may be reduced and the wire section may be enlarged so that the resistance of the primary winding will be reduced in proportion to $$\frac{T_2}{T_1} \times \frac{\text{wire section triangular}}{\text{wire section sinusoidal}}$$

and the reactance of the primary will be reduced proportionate to $$\left(\frac{T_2}{T_1}\right)^2$$

From the above it may be deduced that with a sinusoidal field form, for the same iron losses that occur with a triangularly distributed flux, the number of turns, the ohmic resistance, and the primary reactance may be reduced and therefore the efficiency, power factor, the starting torque, and the maximum load capacity may be increased. I am well aware that the triangular field form is obtained only in extreme cases but as a rule the field form factor is found to be in the neighborhood of from 1.7 to 1.9. Thus a field form factor of approximately 1.57 which may be obtained according to my invention represents a considerable improvement over existing practices.

According to this invention an induction motor is provided with an advantageous form of winding which produces a flux distribution which approaches sinusoidal, which has less turns and lower resistance than conventional motors, which utilizes the same winding both for starting and for running, and which may be started or reversed without interruption of any of the windings.

My invention also contemplates an advantageous winding and slot arrangement whereby a portion of the slots have less conductors than others. With this construction I am able to produce a field flux form which approaches sinusoidal, with its attendant advantages, and to reduce the leakage flux by providing means for positioning the conductors in the slots having less conductors, in the upper portion of such slots. This construction is also advantageous in that all the slots may be made the same size, which produces manufacturing economies, and the lower portions of the slots having the least turns may be used for ventilating ducts.

I have illustrated a preferred embodiment of my invention in the accompanying drawings, and referring thereto:

Fig. 9 is a longitudinal cross-section of an induction motor embodying certain features of my construction;

Fig. 10 is a transverse section thereof taken on line 10—10 in Fig. 9;

Fig. 11 is an enlarged view of a portion of Fig. 10;

Fig. 12 is a simplified development of a two pole stator winding of the type used in the motor shown in Figs. 9–11.

Fig. 13 is a simplified wiring diagram thereof;

Figure 1:
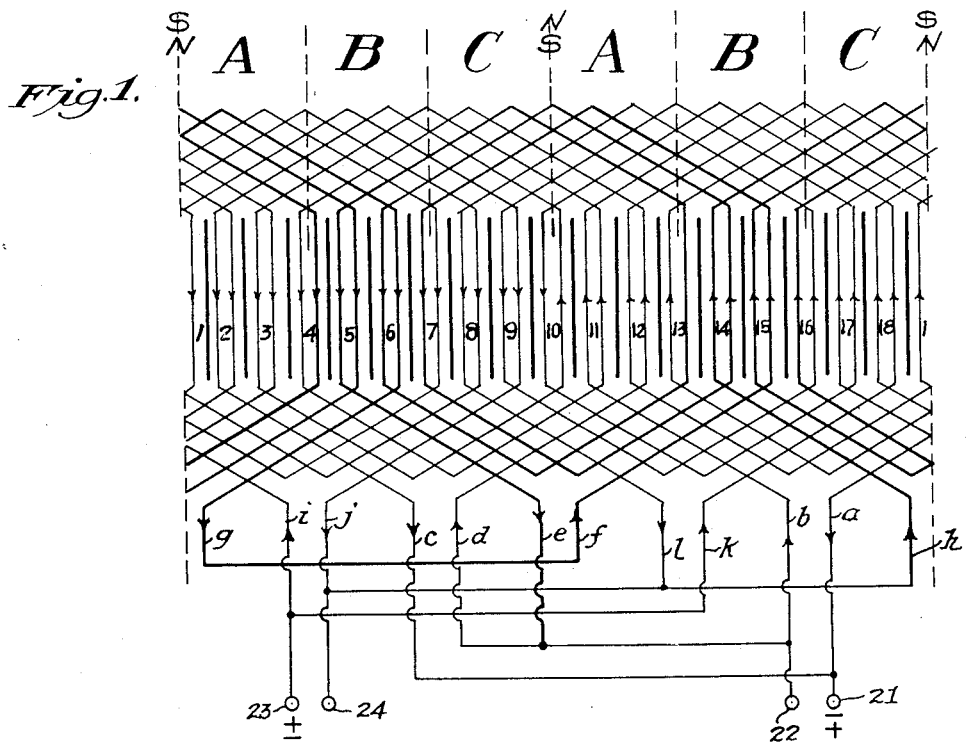
Fig. 1 is a simplified development of a stator winding according to my invention.

Referring to Fig. 1, I have shown a developed view of a single-phase induction motor stator having 18 slots and provided with a two pole lap winding which is divided, for the sake of simplicity, into six groups, namely, groups $a$—$b$, $c$—$d$, $e$—$f$, $g$—$h$, $i$—$j$, and $k$—$l$. Groups $a$—$b$ and $c$—$d$ are connected in parallel, groups $i$—$j$ and $k$—$l$ are connected in parallel, and groups $e$—$f$ and *g—h* are connected in series with each other and in series with the two parallel groups. Groups *a—b* are brought out to terminals marked 21 and 22 and groups *k—l* are brought out to terminals 23 and 24. The arrows on the conductors show the direction of the current in the windings at a given instant when terminals 21 and 23 are connected to a source of power, and it will be seen that the current is flowing downwardly in slots 1 to the center of slot 10 and upwardly in the remaining slots, so that the center of one pole, marked N—S, will lie in the center of slot 10 and the center of the other pole, marked S—N, will lie in the center of slot 1. By using the same size wire for all of the coil groups, and the same number of conductors in each slot, the flux distribution over each pole face will closely approximate the sinusoidal in a direction along the periphery of the stator during running of the motor, as will be more fully brought out hereinafter.

By using a fully distributed winding connected in the above-described fashion the two parallel groups on each side of the pole centers N—S and S—N provide only half the ampere turns supplied by the two groups of coils in series which are located in the neutral zone between the two pole centers. This condition is fulfilled only during running at or near synchronous speed and tends to produce a sinusoidal flux distribution with its attendant advantages.

Figures 2, 3:
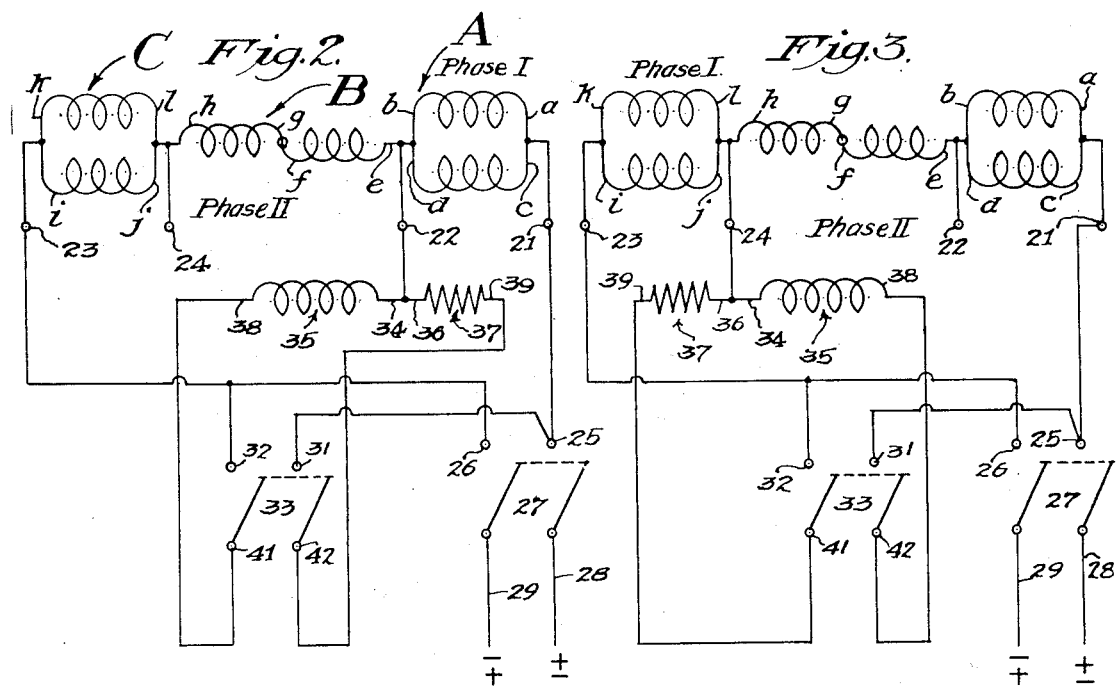
Fig. 2 is a diagrammatic representation of the winding shown in Fig. 1 showing the method of connection for starting rotation in a given direction.
Fig. 3 is a diagram corresponding to Fig. 2, showing the method of connection for starting rotation in a direction opposite to that shown in Fig. 2.

In Fig. 2 I have indicated the parallel connected coil groups with the letters A and C and the series connected group with the letter B. In Fig. 1 I have divided the space along the periphery of the stator into three equal zones between the successive pole centers by the dotted lines and have designated the spaces between the dotted lines by the letters A, B, and C. It may be seen by inspection of Figs. 1 and 2 that the conductors indicated by the letters A, B and C in Fig. 2 pass through the slots in the zones designated A, B, and C in Fig. 1. Thus the slots adjacent the center of the poles are occupied by conductors from the parallel groups and the slots intermediate the pole centers are occupied by conductors from the series groups.

In constructing a single phase motor of the type using distributed windings such as described herein, the stator periphery is first divided into an even number of peripherally successive, substantially identical pole areas, the number depending on the number of poles desired. The winding is then constructed and distributed in the slots in the faces of these pole areas in such manner as to polarize successive pole areas oppositely. Thus in Fig. 1 the stator periphery has been divided into two contiguous pole areas, the central portion of one of these areas being designated S—N and the other being designated N—S. Zones A and C lie in the central portion of a pole area and on opposite sides thereof while the zones B lie intermediate the centers of the successive pole areas and are divided by the imaginary boundary between successive pole areas. This same notation is used throughout the ensuing description.

Furthermore, throughout the ensuing description the lines passing through the stator slots and referred to as conductors or as parts of coil groups, represent the coil sides of the coils forming the coil groups.

The stator winding shown in Fig. 1 has been diagrammatically illustrated in Fig. 2 in order to more clearly show the current paths in the windings and the connections which may be employed for starting. Terminals 21 and 23 are respectively connected to switch contacts 25 and 26 of a double pole, single throw line switch 27 which is connected to line terminals 28 and 29. Switch points 25 and 26 are respectively connected to switch points 31 and 32 of a double pole, single throw return switch 33. Terminal 22 is connected to one end 34 of an auxiliary inductance 35 and to one end 36 of an auxiliary resistor 37, the other ends 38 and 39 of said inductance and resistor are respectively connected to switch points 41 and 42 which are complementary to switch points 32 and 31 of switch 33. The motor may be started by simultaneously closing switches 27 and 33; the operation of switch 27 throws the full line voltage across all the windings in series through terminals 21 and 23 and the operation of switch 33 impresses the line voltage across inductance 35 and resistance 37 in series.

During starting, due to the connections of the inductance 35 and the resistance 37 to the terminal 22 an electrical phase difference is produced between current in the parallel groups of windings *a—b* and *c—d*, which are designated as phase 1, and current in the remaining series and parallel groups which are designated as phase 2. This phase difference results in the production of an approximate two-phase rotating field and the motor will start with a starting torque comparable to that which may be obtained with a two-phase motor. At any given time after the motor has started to rotate the switch 33 may be opened and the motor will then operate as a single-phase induction motor.

Any suitable type of double pole, single throw return switch may be used for the switch 33. A conventional centrifugal switch such as those well known to the art may be employed in the place of the switch 33 or suitable current or voltage operated relays may be utilized to automatically perform the function of opening the switch 33 when the motor has acquired sufficient speed. In any event, I prefer to use well-known automatic means for opening the starting circuit so that the motor may be started simply by closing the line switch 27.

It will be noted that the center of group *a—b* is displaced approximately 120° mechanically from the pole center N—S and that the center of the group *c—d* is placed approximately 180° mechanically from the group *a—b* and 60° on the other side of the pole center N—S. Thus by producing currents in the groups *a—b* and *c—d* which are approximately 90° electrically out of phase with the current in the remainder of the windings, an approximate two-phase rotating field is produced in the machine.

In order to produce approximately equal field strengths at the respective poles, it is necessary that the coil groups *a—b* and *c—d* carry larger current during starting than the remaining coil groups. This condition may be readily fulfilled by correctly proportioning the inductance 35 and the resistance 37. The phase difference produced in phase 1 and phase 2 is also dependent upon the proportioning of the inductance 35 and the resistance 37; however, with correctly distributed stator windings an optimum balance between the values of said inductance and resistance may be reached which will give the required current in the two phases and the required phase difference. These relations will be more fully described subsequently.

It should be noted that all of the motor windings are utilized at all times and that the connection and disconnection of the auxiliary inductance and resistance is accomplished without interrupting the continuity of any of the motor windings.

Referring to Fig. 3, I have shown a set of connections which may be utilized to start the motor in a direction opposite to that shown in Fig. 2. In this figure the parallel groups i—j and k—l are designated as phase 1, and the remaining groups are designated as phase 2. As in Fig. 2, the resistance 37 is shown in parallel with phase 1 and the inductance 35 is shown in parallel with phase 2. The starting operation is identical with that shown in Fig. 2; the motor will operate in exactly the same manner as shown in Fig. 2, except that it will rotate in the opposite direction.

Figure 4:
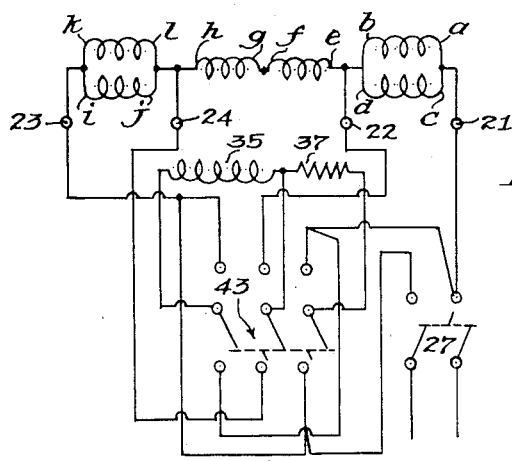
Fig. 4 is a diagrammatic representation of the connections which may be used to start the motor in either direction and to reverse the motor when in operation, this diagram representing a combination of the connections shown in Figs. 2 and 3.

From a consideration of Figs. 2 and 3 it will be seen that the starting of the motor in either direction and the reversal thereof may be easily accomplished by combining the wiring diagrams of Figs. 2 and 3 as has been done in Fig. 4. This may be accomplished by substituting a double throw, triple pole return switch 43, which is normally in the open position, for the double pole, single throw return switch 33 of Figs. 2 and 3. The switch 43 then serves to connect the resistance 37 either in parallel with the parallel groups a—b and c—d or in parallel with the parallel groups i—j and k—l, depending upon the direction of rotation required. The direction of rotation of the motor may be reversed while the motor is running by the operation of the switch 43, which switch may be depressed for a time only sufficient to stop the motor and start the rotation in the desired direction. Since the motor of this invention is so simply reversed, and is adapted for relatively high power output, it is admirably applicable to control functions which require rapid reversals. I have found that the motor may be started and reversed continuously over long periods without undue heating.

Figure 5:
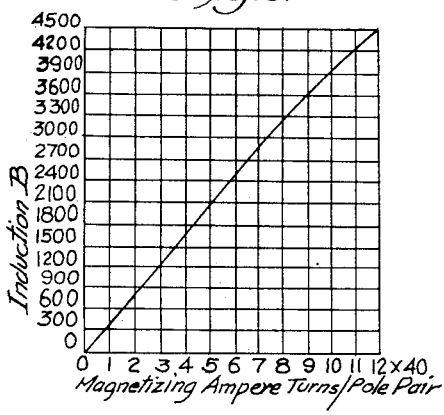
Fig. 5 is a magnetizing curve derived under test conditions.

A motor wound according to my invention was provided with a phase wound rotor and the magnetizing curve shown in Fig. 5 was prepared by measuring the magnetizing current with the rotor open-circuited for a series of different terminal voltages and the maximum flux for each potential was calculated in the following manner:

$E_t$ = Terminal voltage
$K$ = Distribution factor
$T$ = Total number of turns
$f$ = Frequency of $E_t$
$\phi_{max}$ = Maximum flux
$I_m$ = Magnetizing current
$AT_m$ = Magnetizing ampere turns
$T$ = Turns
$P$ = Number of poles
$A_p$ = Area of pole face (1) $$\phi_{max} = \frac{E \times 10^8}{4.44 \times K \times T \times f}$$

(2) $$AT_m = \frac{I_m \times T \times 2.82}{P}$$

(3) $$B_{max} = \frac{1.57 \times \phi_{max}}{A_p}$$

Figure 6:
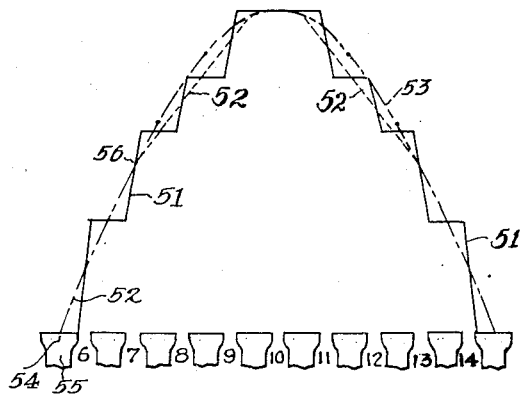
Fig. 6 is a flux distribution curve derived from the magnetizing curve of Fig. 5.

A portion of a stator equivalent to one pole pitch is shown in Fig. 6 and the actual value of the flux density B is plotted vertically with relation to the stator teeth, and is shown as a solid zigzag line 51. The dotted curve 52 represents an average value of the line 51 and closely approximates a sine curve 53 which is shown in dot-dash lines. The sine curve 53 coincides practically with the curve 52 from the point 54 in the center of a tooth indicated at 55 to a point 56 corresponding to an induction of approximately 2400. The opposite half of the sine curve and practically resultant curve 52 show the same coincidence.

The slots shown in Fig. 6 are numbered to correspond with those shown in Fig. 1 and by referring to Fig. 1 it may be seen that the tooth between slots 6 and 7 is linked by two of the series conductors (assuming for simplicity that each line or coil side is a conductor) which carry twice the current that the parallel conductors carry and therefore is linked in proportion to four ampere turns. The tooth lying between slots 7 and 8 is linked additionally with one series conductor and one parallel conductor, making a total proportional to seven ampere turns. This procedure may be carried out for the remaining teeth which lie between the slots 6 and 14 and will produce the zigzag curve shown in Fig. 6.

In Figs. 9 and 10 I have illustrated an induction motor which embodies certain advantageous features of my invention. The motor is indicated generally at 50 and may comprise end bells 51 and 52 secured to a main frame structure 53. A rotor 54 is carried by a shaft 55 journaled in bearings provided in the end bells 51 and 52. The rotor may be of conventional construction and comprise a plurality of laminations 56 provided with slots carrying suitable cast rotor bars 57 connected to end rings 58. Ventilating ducts may be provided in the rotor core as at 59 to provide for the cooling thereof.

The stator may comprise a plurality of laminations 61 provided with suitable slots 62 extending transversely to the plane of rotation of the rotor 54. The stator 61 may be secured to the main frame 53 in any of the conventional manners, as by conventional clamping rings. In order to avoid confusing detail, the stator winding is shown in outline at 63 in Fig. 9 and in cross-section in the slots 62 in Fig. 10. Air circulation for ventilating purposes may be secured in the conventional manner as by a fan mounted on one end of the shaft 55.

An advantageous form of fan is indicated at 64 which is provided with a conical baffle or deflector 64a which divides the incoming air stream so that a portion of the stream outwardly of the baffle 64a cools the ends of the windings 63 and passes outwardly through ventilating openings in the stator core and motor frame, as will be described subsequently. The portion of the air stream inwardly of the baffle bathes the end rings 58 and the rotor and stator teeth, and passes through the ventilating ducts 59 in the rotor. A second fan is indicated at 64b at the opposite end of the rotor for increasing the circulation through the rotor and generally improving circulation of air.

I find it advantageous to wind a starting resistor such as the starting resistor 37 about the frame of the motor so that the motor and the starting resistor may be supplied as a unit. As an example of such construction I may wind a strip of insulating material such as asbestos about the periphery of the main frame 53 as at 65 and then wind the required number of turns of resistance wire about the insulating strip 65 as at 66. For the most satisfactory results the resistor 66 should be nearly non-inductive and I find it advantageous to wind this wire bifilar. In order to secure adequate protection for the resistance element 66, I find it advantageous to provide a pair of upstanding ring members 67 and 68 on the main frame member 53 which are spaced from one another in a direction transverse to the plane of rotation of the rotor and which extend around the circumference of the main frame member 53. Thus the upstanding ring members 67 and 68 provide an annular channel 69 which extends around the circumference of the frame. A cylindrical cover member 71 may then be advantageously slid into position over the ring members 67 and 68 and held in position thereon in any convenient manner such as by cap screws 72. A plurality of perforations 73 are then provided in the cover member 71 to allow for the passage of air outward from the annular channel 69.

Ventilation for the resistor 66 may be provided by a plurality of slots 73 which are spaced around the circumference of the main frame member 53 and afford communication between the interior of the annular channel 69 and the interior of the motor frame so that air supplied by the fan 64 will pass outwardly through the slots 73 around the resistance 66 and outwardly through the perforations 73. Ventilation for the stator 61 may be provided in the conventional manner through spaces 74 between the outside circumference of the stator and the main frame 53. Additional ventilation of the stator may also be afforded by half-filled slots, as will be brought out subsequently.

It will be appreciated that a starting inductance such as the inductance 35 may also be wound around the motor frame after the manner of the resistor 66. In such case the inductance is preferably wound around the frame and the resistor is then wound around the inductance. This arrangement is not particularly satisfactory for a squirrel cage rotor since the rotor acts as a short-circuited transformer secondary and the inductance coil acts as a transformer primary. However, this trouble is not encountered with a phase wound rotor and the motor frame may be satisfactorily employed as the core for the inductance. The ventilating arrangement need not be changed when the inductance is wound along the resistor on the motor frame. However, it may be necessary to make the annular channel 69 somewhat deeper with this arrangement.

I have illustrated an alternative form of construction in Figs. 10 and 11 in which the parallel groups of coils shown in Figs. 1 through 4 may be omitted. This arrangement will be satisfactory with a high resistance squirrel cage rotor or with a phase wound rotor provided with a starting resistor, if the starting requirements are not too severe. Under such circumstances the slots adjacent the center of the pole faces will contain, for example, only half the turns of the slots adjacent the neutral space. In Fig. 10 I have shown a transverse section of the two poles of a four-pole single phase induction motor. The three slots 62a, 62b and 62c, and 62d, 62e and 62f on the respective left and right sides of a dotted line 75 indicating the center of a pole face, are shown only half filled with conductors. The slots 62g and 62h, and 62i and 62j adjacent the left and right neutral zones respectively are shown completely filled with conductors. This distribution of conductors will produce a flux distribution which approaches sinusoidal when the motor is operating at full load. Referring to Fig. 11, the slots 62i, 62a and 62b are shown in detail and it will be noted that only the upper half of slots 62a and 62b carries conductors.

The slots 62 are formed according to conventional practice between stator teeth 76, each having a root portion 77 and a crown portion 78. Notches 79 are preferably provided on each of the stator teeth 76 at a position intermediate the root and crown portions. The notches 79 then form channels on each side of the slots 62 which extend along the length of the teeth in a direction transverse to the plane of rotation of the rotor. The conductors in the slots are indicated in cross-section at 81 and it will be seen that the conductors in the slot 62i substantially completely fill the slot and extend from the root to the crown portions of the adjacent teeth on each side of the slot 62i.

The conductors 81 in the slots 62a and 62b fill only the upper half of the slots and are held away from the bottom thereof by a wedge 82 of suitable insulating material such as fiber which may be inserted in the channel formed by two notches 79 from one end of the stator. The lower portion of the slots 62a and 62b beneath the bottom of the wedge 82 and above the bottom of the slot, formed by the roots of two adjacent teeth, is then left open to supply ventilating channels 84. These channels 84 then provide for passage of air from the fan 64 through the stator core and outwardly through openings 85 provided in one of the end bells 52 and also through the openings 73 provided in the periphery of the main frame 53. Wedges 85 are shown in position in each of the slots above the winding 81 and are used to hold the winding in place in the slot according to conventional practice.

The minimum thickness in a stator tooth usually occurs adjacent the crown portion thereof and the notches 79 are preferably of such dimensions that they do not reduce the thickness of the tooth below the minimum thickness of the crown portion. The use of filled and partly filled slots whereby ventilation is provided to the partly filled slots presents advantages over providing ventilating ducts at the bottom of each slot. Higher flux densities may be used in a given sized stator and the iron may be more advantageously employed.

The use of half filled slots in which the conductors are wound only in the upper half thereof presents a number of advantages. The magnetic slot leakage is greatly reduced; the starting torque and the maximum load and power factor are substantially improved; the magnetic reluctance of the path of the revolving field flux is kept more uniform and pulsation is reduced; and the unused portions of the slots may be used advantageously for ventilation purposes. The use of notches such as those shown at 79 in the teeth so that all of the teeth are of the same size allows for great manufacturing economies. The same laminations may be used either for motors utilizing the parallel type windings or for motors utilizing the type of winding shown in Figs. 9–13 and the laminations may be made with the ordinary single operation on the notching press. If part of the slots were made deeper than the others, the laminations could not be used interchangeably and would require two complicated notching press operations.

I have illustrated a winding which may be utilized for the motor shown in Figs. 9–11, in Figs. 12 and 13. In order to simplify the description I have shown a developed stator diagram for a two pole motor, it being apparent that the features shown may be incorporated in a four pole motor by those skilled in the art. The winding is made up of three coil groups connected in series, the groups being designated as A, B and C. Group A consists of coil groups a—b and c—d in series, group B consists of coil groups e—f and g—h in series and group C consists of coil groups i—j and k—l in series. Coil groups e—f and g—h each have twice as many turns as any of the remaining groups.

The periphery of the stator in Fig. 12 has been divided into substantially equal zones by dotted lines and the zones are each lettered with an A, B or C. The conductors in the slots, i. e., the coil sides, in each of these zones are from the coil groups designated A, B or C in Fig. 13. Since all the coils are in series, each conductor will carry the same current. It will be seen that slots numbered 4, 5, 6, 13, 14 and 15, each carry twice as many conductors as any of the remaining slots and as a consequence carry twice as much current. It may also be seen from Fig. 12 that the center of each successive pole lies between zones A and C and that the zones B lie intermediate the successive pole centers. Thus the slots adjacent the center of the pole areas carry only half the current that is carried by the slots intermediate the pole centers and a substantially sinusoidal flux distribution along the stator will occur during running of the motor. The line terminals are indicated at 21 and 23 and the starting and reversing terminals are indicated at 22 and 24. This motor may be started and reversed by utilizing the same connections as shown in Figs. 2–4.

If all of the conductors are of uniform size the slots in zones A and C will be only half filled as compared to the slots in zone B and the slots in zones A and C may be used for ventilation as above described. It will also be appreciated that the section of the wire in zones A and C may be double that in zone B and the slots would then all be filled. This latter arrangement is somewhat advantageous since the conductors in zones A or C will carry the heaviest current in starting.

It should also be noted that the parallel groups in Fig. 1 may be wound with wire of half the section of the wire in the series groups to obtain half filled slots in zones A and C. The windings also may be wound for two voltage operation, for example 110/220 volt operation, without departing from the spirit of this invention.

Figures 14, 15:
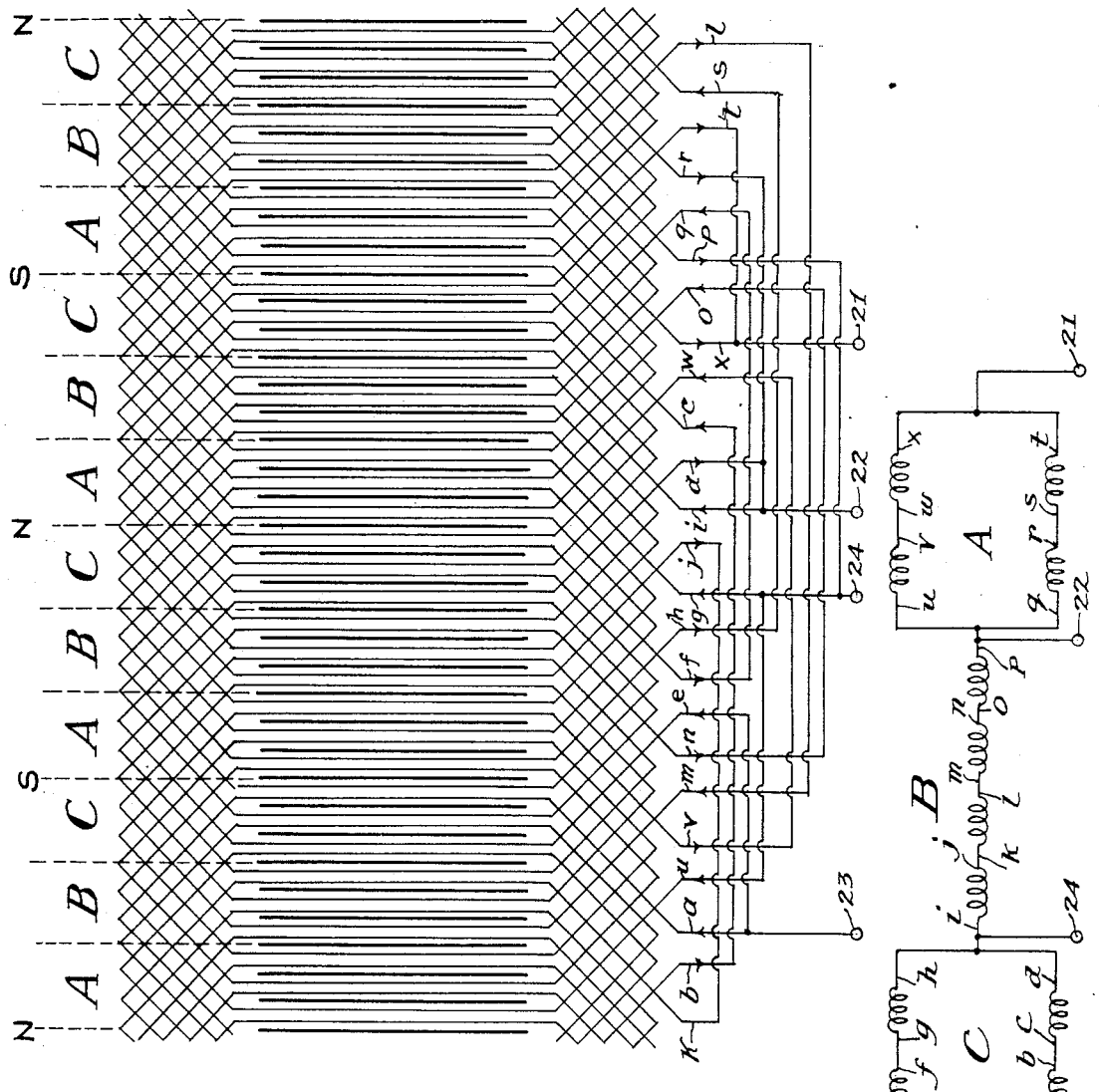
Fig. 14 is a simplified development of a four pole single phase stator winding according to my invention.
Fig. 15 is a simplified wiring diagram thereof.

Referring to Figs. 14 and 15, I have shown a developed stator winding for a four pole single phase motor with 36 slots, and a wiring diagram therefor, respectively. The winding is made up of three groups in series. One group consists of the coil groups a—b and c—d in series, in parallel with the coil groups e—f and g—h in series. The second group consists of four coil groups i—j, k—l, m—n, and o—p in series. The third group consists of coil groups q—r and s—t in series, in parallel with coil groups u—v and w—x in series. The line terminals 21 and 23 are respectively connected to the coil ends x and t, and a and e, and the starting lead 22 is connected to the junction of the leads p, q, and u, and the other starting lead 24 is connected to the junction i, d, and h. The connections for starting of this motor would be exactly the same as for the motor shown in Fig. 1 and this motor may also be reversed in exactly the same manner.

The winding of this four pole motor is admirably suited for commercial production since all the slots contain equal numbers of conductors and all the coils may contain the same number of turns. This motor may be wound, for example, with 36 coils made up in three-coil units, any of the groups, for example the group a—b, representing a three-coil unit, and all of the coils may be wound full pitch. It will be noted that the slots between the successive poles, the center lines of which are indicated at N and S, may be divided into three intervals in which each interval contains conductors from only one of the three winding groups. Thus in Fig. 15 the letters A, B, and C may be used to designate the three winding groups. In Fig. 14 I have shown the stator periphery divided into equal intervals by dotted lines and the spaces between these dotted lines are marked with the letters A, B, and C which correspond to the wiring groups A, B, and C in Fig. 15. It can be seen by inspection of Fig. 14 that the slots adjacent the centers of the poles are filled with conductors (coil sides) from the groups A and C, which are the parallel groups, and that the slots intermediate the poles are filled with conductors (coil sides) from the group B, which is the series group. This grouping of conductors produces the substantially sinusoidal field along the periphery of the stator during running of the motor.

The three group winding of this invention is most advantageously applied to motors which have a number of slots per pole which is divisible by three, for example, six, nine, twelve, or fifteen slots per pole, and with full pitch coils. With this arrangement all the coils may be uniform and the motor may be easily fabricated under production methods. However, it is within the scope of this invention to use either short pitch windings or to use a winding in which the coils have different numbers of turns.

Figures 16, 17:
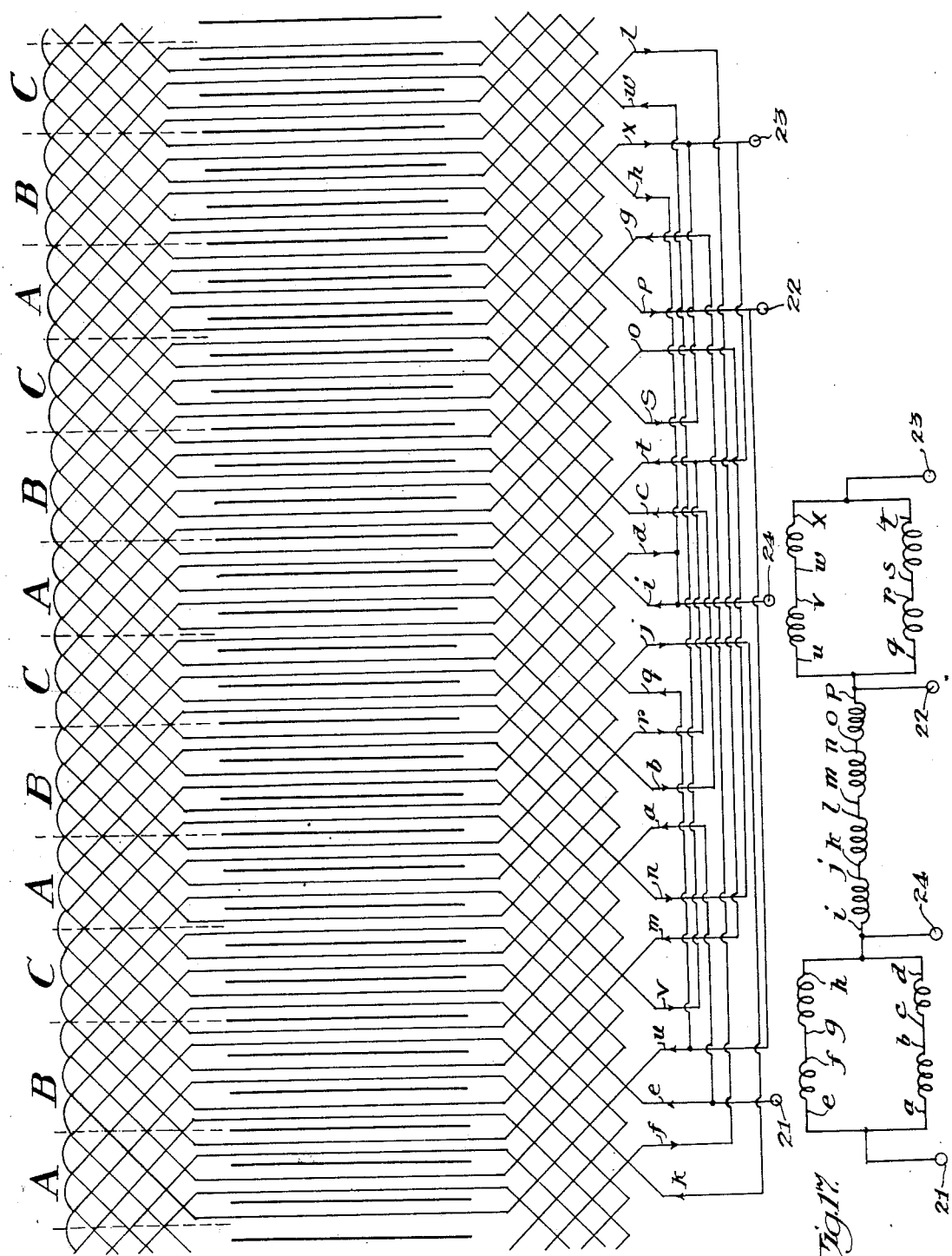
Fig. 16 is a view corresponding to Fig. 14, in which the winding is applied to a stator having a number of slots per pole which is not divisible by three.
Fig. 17 is a simplified wiring diagram thereof.

The winding diagrammatically illustrated in Figs. 14 and 15 may be used with slight modifications on motors which have a number of slots per pole which is not divisible by 3. For example, a four pole motor with eight slots per pole, or a total of 32 slots, is shown in Figs. 16 and 17 as wound with 32 coils in which there are eight three-coil groups and four two-coil groups. The winding shown in Fig. 15 may be modified for a 32-slot winding by making the groups e—f, c—d, w—x, and q—r as two-coil groups, while leaving the remainder of the groups as three-coil groups, as shown in Figs. 16 and 17. Each of the coils is wound full pitch so as to span eight teeth. The center of each pole would then lie in the center of a slot and the distance along the periphery of the stator between the centers of the poles would still be divided into three bands of conductors. The conductors from the coil groups designated as A occupy slots at the center of the pole and the next two slots to the right thereof, the coils from the group designated as B would occupy the next three slots, and the coils from the group designated as C would occupy the next two slots and one-half of the slot beneath the center of the next successive pole. It is believed apparent that the flux distribution with this arrangement of coils will be substantially sinusoidal in a direction along the periphery of the stator during running of the motor and that substantially the same advantageous results can be obtained with this winding as with the winding shown in Figs. 14 and 15.

Figure 7:
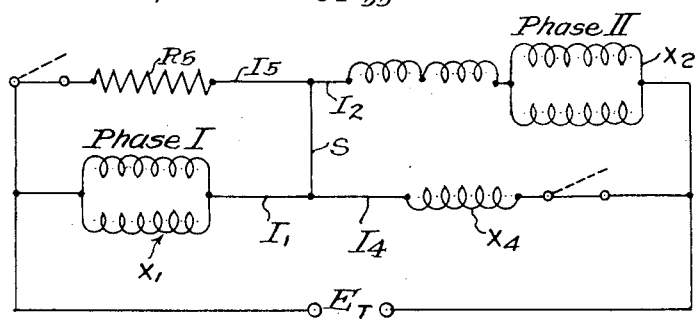
Fig. 7 is a wiring diagram corresponding in general to Fig. 2 or 3, illustrating certain relations I have found advantageous.

The winding illustrated produces another advantage over existing constructions besides the increase in efficiency obtained with the sinusoidal flux distribution. This advantage also results from the novel distribution and arrangement of the winding and the points of connection utilized for starting. An example of the starting connection for the motor shown in Fig. 1 is illustrated in Fig. 7 and it will be noted that phase 1 which consists of two parallel groups has a very large reactance $X_1$ compared to its resistance due to the paralleling of these groups. In present motors the reactance and resistance of such a portion of the winding would be approximately equal. Thus the lag in phase 1 is necessarily higher than in conventional constructions. At the same time, since the reactance $X_2$ of phase 2 is small compared to the resistance thereof, the lag of phase 2 is considerably lower than the lag for phase 1, due to the fact that phase 1 has two additional groups of conductors in series with the parallel groups. When the motor is connected for starting as shown in Fig. 7 the resistor $R_5$ tends to further decrease the lag of phase 2 while the reactance $X_4$ tends to further increase the lag of phase 1. The connection of the resistor and inductance for starting therefore produces current $I_1$ in phase 1 and current $I_2$ in phase 2 which are time displaced, and due to the distribution of the winding in phase 1 and phase 2, the successive magnetic poles produced by each of these phases will be space displaced. Thus an approximate two phase rotating field will be produced by the starting resistance and inductance and this will be accomplished without disturbing the continuity of the windings in phase 1 and phase 2 and without the use of any additional or auxiliary windings.

Figure 8:
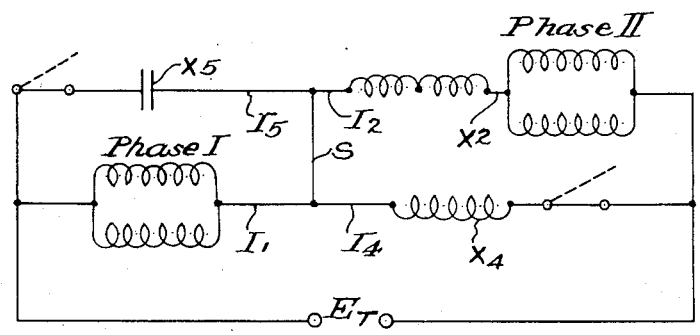
Fig. 8 is a wiring diagram illustrating an alternative mode of connection for starting.

In Fig. 8 a set of starting connections are shown to correspond to those shown in Fig. 7, and a capacity reactance $X_5$ has been substituted for the resistor $R_5$. When the condenser is substituted for the resistor the currents in phase 1 and phase 2 may be brought more nearly to 90° from one another, the starting losses may be reduced, the starting current may be reduced, and the starting pulsations of the field may be practically eliminated. Condensers, however, are usually troublesome in that they break down easily and require more maintenance, and will not ordinarily be used unless the advantages thereof outlined above outweigh the trouble-free operation which may be obtained with the starting resistor.

It should also be noted that the motor may be started by utilizing either a single condenser, resistor or inductance across any one of the phases.

I have also found that certain advantageous relations exist between the electrical constants of phase 1 and phase 2 and the currents carried by these phases during the starting period. I have found that during starting the current through the non-inductive resistor $R_5$ should be substantially equal to the current through phase 2 and that the current through phase 1 should be substantially equal to the current through the inductive reactance $X_4$. This relation may be easily defined by stating that the ratio of the voltage drop across phase 1 to the voltage drop across the inductive reactance is substantially equal to the ratio of the voltage drop across the non-inductive resistance to the voltage drop across phase 2. Thus during starting the current through the conductor indicated at S in Figs. 7 and 8 is practically zero and this conductor may be opened without appreciably impairing the starting characteristics.

I have found by utilizing an adjustable resistance $R_5$ and adjutsable reactance $X_4$ that when these elements are properly adjusted to comply to the above-mentioned relations and the connection S is opened and a voltmeter connected in the place thereof, the voltage indicated will be negligible.

For the conditions of best balance during the starting period the ampere turns supplied by phase 1 should be substantially equal to the ampere turns supplied by phase 2. This condition and the conditions mentioned above may be summarized mathematically as follows:

$AT_1$ = Ampere turns of phase 1
$AT_2$ = Ampere turns of phase 2
  $I_1$ = Starting current in phase 1
  $I_2$ = Starting current in phase 2
  $T_1$ = Number of turns in phase 1
  $T_2$ = Number of turns in phase 2
  $K_1$ = Distribution factor for phase 1
  $K_2$ = Distribution factor for phase 2
  $Z_1$ = Impedance of phase 1
  $Z_2$ = Impedance of phase 2
  $Z_4$ = Impedance of $X_4$ (1) $AT_1 = AT_2 = 1.41 I_1 T_1 K_1 = 1.41 I_2 T_2 K_2$
(2) $I_1 : I_2 = T_2 K_2 : T_1 K_1$
(3) $I_1 = I_2 \dfrac{T_2 K_2}{T_1 K_1}$
(4) $I_1 Z_1 : I_1 Z_4 = I_2 R_5 : I_2 Z_2$ Although the motor will start with only a single auxiliary starting device or with a pair of auxiliary starting devices whose electrical constants may be varied over rather wide limits, the most advantageous starting characteristics are realized when the above set of relations is fulfilled. It will also be noted that phase 1 which contains only parallel groups will carry the highest current during starting and that phase 2 which contains series groups will have a lower current than phase 1. This winding arrangement therefore has an advantage in starting and reversing in that none of the conductors are particularly overloaded and no abnormal heating will result during these periods.

I claim:

1. In a single phase induction motor, having a rotor and a stator provided with a plurality of slots extending transversely with respect to the plane of rotation of said rotor, said stator having an even number of peripherally successive, substantially identical contiguous pole areas, the combination which comprises: a single phase winding comprising conductors distributed substantially uniformly in said slots to polarize successive pole areas oppositely and provide a substantially sinusoidal flux distribution along each pole area in a direction along the periphery of said stator during running of said motor, the conductors which occupy the slots in the central portions of the pole areas being arranged in two circuits each comprising two parallel paths, said two circuits being connected in series and forming portions of a series circuit, the conductors in one of said two circuits occupying slots on one side of the center of each of said pole areas and the conductors in the other of said two circuits occupying slots on the other side of the center of each of said pole areas, the conductors in the remaining portion of said series circuit occupying the slots intermediate the centers of the successive pole areas; an impedance; and means for shunting said impedance across a part only of said winding to produce a phase difference between the current in one of said two circuits and the current in the remaining portions of said series circuit without interrupting the continuity of said winding, whereby the current in the conductors occupying the same side of the central portion of each of said pole areas is out of phase with the current in the remaining conductors occupying each pole area and produces flux which is time and space displaced with respect to the flux produced by said remaining conductors and exerts a starting torque on said rotor.

2. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their coil sides occupying slots intermediate the centers of successive pole areas, and each of the other winding portions comprising a pair of coil groups connected in parallel and having their coil sides occupying slots in the central portions of the pole areas, one of said other winding portions having its coil sides occupying slots on one side of the center of each of said pole areas and the other one of said other winding portions having its coil sides occupying slots on the other side of the center of each of said pole areas; an impedance; and means for shunting said impedance across a part only of said winding to produce a phase difference between the current in one of said other winding portions and the current in the remaining winding portions without interrupting the continuity of said winding, whereby the current in the coil sides occupying the same side of the central portion of each of said pole areas is out of phase with the current in the coil sides occupying the remaining slots in each of said pole areas and produces flux which is time and space displaced with respect to the flux produced by said coil sides in said remaining slots and exerts a starting torque on said rotor.

3. The combination set forth in claim 2, the cross-section of the wire in said series connected coil groups being larger than the cross-section of the wire in said parallel connected groups.

4. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding uniformly distributed in all of said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their coil sides occupying slots intermediate the centers of successive pole areas, and each of the other winding portions comprising a pair of coil groups connected in parallel and having their coil sides occupying slots in the central portions of the pole areas, one of said other winding portions having its coil sides occupying slots on one side of the center of each of said pole areas and the other one of said other winding portions having its coil sides occupying slots on the other side of the center of each of said pole areas; an impedance; and means for shunting said impedance across a part only of said winding to produce a phase difference between the current in one of said other winding portions and the current in the remaining winding portions without interrupting the continuity of said winding, whereby the current in the coil sides occupying the same side of the central portion of each of said pole areas is out of phase with the current in the coil sides occupying the remaining slots in each of said pole areas and produces flux which is time and space displaced with respect to the flux produced by said coil sides in said remaining slots and exerts a starting torque on said rotor.

5. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding comprising conductors distributed equally in all of said slots to polarize successive pole areas oppositely and provide a substantially sinusoidal flux distribution along each pole area in a direction along the periphery of said stator during running of said motor, the conductors which occupy slots in the central portions of the pole areas being arranged in two separate coil groups connected in parallel, and the conductors which occupy slots intermediate the centers of the successive pole areas being all connected in series with each other and with said parallel connected coil groups.

6. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their coil sides occupying slots intermediate the centers of successive pole areas, and each of the other winding portions comprising a pair of coil groups connected in parallel and having their coil sides occupying slots in the central portions of the pole areas, one of said other winding portions having its coil sides occupying slots on one side of the center of each of said pole areas and the other one of said other winding portions having its coil sides occupying slots on the other side of the center of each of said pole areas; an inductive impedance; a resistance; and means for connecting said inductive impedance in parallel with two adjacent ones of said winding portions and for connecting said resistance in parallel with the remaining one of said other winding portions to produce a phase difference between the current in said remaining one of said other winding portions and the current in said two adjacent ones of said winding portions without interrupting the continuity of said winding, whereby the current in the coil sides occupying the same side of the central portion of each of said pole areas is out of phase with the current in the coil sides occupying the remaining slots in each of said pole areas and produces flux which is time and space displaced with respect to the flux produced by said coil sides in said remaining slots and exerts a starting torque on said rotor.

7. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their coil sides occupying slots intermediate the centers of successive pole areas, and each of the other winding portions comprising a pair of coil groups connected in parallel and having their coil sides occupying slots in the central portions of the pole areas, one of said other winding portions having its coil sides occupying slots on one side of the center of each of said pole areas and the other one of said other winding portions having its coil sides occupying slots on the other side of the center of each of said pole areas; an inductive impedance; a non-inductive impedance; and means for connecting said inductive impedance in parallel with two adjacent ones of said winding portions and for connecting said non-inductive impedance in parallel with the remaining one of said other winding portions to produce a phase difference between the current in said remaining one of said other winding portions and the current in said two adjacent ones of said winding portions without interrupting the continunity of said winding, whereby the current in the coil sides occupying the same side of the central portion of each of said pole areas is out of phase with the current in the coil sides occupying the remaining slots in each of said pole areas and produces flux which is time and space displaced with respect to the flux produced by said coil sides in said remaining slots and exerts a starting torque on said rotor.

8. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding uniformly distributed in said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their coil sides occupying slots intermediate the centers of successive pole areas, and each of the other winding portions comprising a pair of coil groups connected in parallel and having their coil sides occupying slots in the central portions of the pole areas.

9. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding comprising conductors distributed equally in all of said slots to polarize successive pole areas oppositely and provide a substantially sinusoidal flux distribution in the direction along the periphery of said stator during running of said motor, said winding being made up of equal turned coil groups arranged in three winding portions, all of said winding portions being connected in series, the intermediate one of said winding portions comprising a pair of coil groups connected in series, the conductors forming said groups occupying slots intermediate the centers of successive pole areas, each of said other winding portions comprising a pair of coil groups in parallel, the conductors forming said groups occupying slots in the central portions of the pole areas, there being approximately twice as much current flowing through each conductor in the intermediate winding portion as there is in each conductor in the remaining winding portions.

10. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, two of said portions each comprising a pair of coil groups connected in parallel and the other one of said winding portions comprising a pair of coil groups connected in series, the coils in said last-mentioned coil groups each being full pitch and having their sides passing through slots intermediate the centers of successive pole areas.

11. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in all of said slots to polarize successive pole areas oppositely and provide a substantially sinusoidal flux distribution along each pole area in a direction along the periphery of said stator during running of said motor, said winding being made up of equal turned coil groups arranged in three winding portions, all of said winding portions being connected in series, the intermediate one of said portions comprising a pair of coil groups connected in series and having their sides occupying slots intermediate the centers of successive pole areas, and each of the other winding portions comprising a pair of coil groups connected in parallel and having their sides occupying slots in the central portions of the pole areas, the current flowing through each coil of the parallel connected coil groups being equal to approximately one-half of the current flowing through each coil of the series connected coil groups.

12. In a single phase induction motor having a rotor and a stator provided with a plurality of slots extending transversely with respect to the plane of rotation of said rotor, said stator having an even number of peripherally successive, substantially identical contiguous pole areas, the combination which comprises: a single phase winding distributed in all of said slots to polarize successive pole areas oppositely and provide a substantially sinusoidal flux distribution along each pole area in a direction along the periphery of said stator during running of said motor, said winding being made up of equal turned groups of full pitch coils distributed equally in said slots and arranged in three winding portions, all of said winding portions being connected in series, the intermediate one of said portions comprising a pair of coil groups connected in series and having their sides occupying slots intermediate the centers of successive pole areas, and each of said other winding portions comprising a pair of coil groups connected in parallel and having their sides occupying slots in the central portions of the pole areas.

JACOB H. SCHURCH.